US010216433B2

(12) United States Patent
Don et al.

(10) Patent No.: US 10,216,433 B2
(45) Date of Patent: Feb. 26, 2019

(54) ACCESSING A VIRTUAL VOLUME ON A STORAGE ARRAY

(71) Applicant: EMC Corporation, Hopkinton, MA (US)

(72) Inventors: Arieh Don, Newton, MA (US); Vinay Rao, Bangalore (IN); Manickavasaham Senguden, Bangalore (IN); Subin George, Framingham, MA (US); Kevin Loehfelm, Wrentham, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/014,458

(22) Filed: Feb. 3, 2016

(65) Prior Publication Data

US 2017/0168739 A1 Jun. 15, 2017

(30) Foreign Application Priority Data

Dec. 11, 2015 (IN) ............................ 6638/CHE/2015

(51) Int. Cl.
*G06F 3/06* (2006.01)
(52) U.S. Cl.
CPC .......... *G06F 3/0619* (2013.01); *G06F 3/0665* (2013.01); *G06F 3/0673* (2013.01)
(58) Field of Classification Search
CPC ..... G06F 3/0619; G06F 3/0665; G06F 3/0673
See application file for complete search history.

(56) References Cited

U.S. PATENT DOCUMENTS

| 9,329,804 | B2 | 5/2016 | Lassa | |
|---|---|---|---|---|
| 2008/0172539 | A1 | 7/2008 | Boss et al. | |
| 2011/0238740 | A1 | 9/2011 | Yu | |
| 2012/0254566 | A1* | 10/2012 | Clayton | .................. G06F 12/16 711/162 |
| 2012/0278561 | A1* | 11/2012 | Mitsuno | ................ G06F 3/0605 711/154 |
| 2013/0103778 | A1* | 4/2013 | Hayashi | .................. G06F 3/061 709/213 |
| 2013/0297873 | A1 | 11/2013 | Hyde, II et al. | |
| 2014/0337576 | A1 | 11/2014 | Burton et al. | |
| 2017/0131920 | A1* | 5/2017 | Oshins | .................. G06F 3/0613 |

OTHER PUBLICATIONS

U.S. Appl. No. 14/995,532, filed Jan. 14, 2016, Don et al.
U.S. Non-Final Office Action dated Dec. 13, 2017 for U.S. Appl. No. 14/995,532; 13 Pages.

(Continued)

*Primary Examiner* — Nanci N Wong
(74) *Attorney, Agent, or Firm* — Daly, Crowley Mofford & Durkee, LLP

(57) ABSTRACT

In one aspect, a method includes receiving, at a storage array, a command to a virtual volume from a host, extracting a virtual volume index from the command; reading a table using the virtual volume index to determine the logical unit where the virtual volume is stored and executing the command at the logical unit with the virtual volume. The command is one of a read command to read data from the virtual volume or a write command to write data to the virtual volume.

14 Claims, 4 Drawing Sheets

(56) References Cited

OTHER PUBLICATIONS

Response to U.S. Non-Final Office Action dated Dec. 13, 2017 for U.S. Appl. No. 14/995,532; Response filed on Mar. 12, 2018; 10 pages.
Office Action Summary dated May 1, 2018 for U.S. Appl. No. 14/995,532; 12 pages.
Notice of Allowance dated Sep. 27, 2018 for U.S. Appl. No. 14/995,532; 6 pages.
Response to Final Office Action dated May 1, 2018 and filed on Aug. 24, 2018 for U.S. Appl. No. 14/995,532; 15 pages.

* cited by examiner

ACCESSING A VIRTUAL VOLUME ON A STORAGE ARRAY

RELATED PATENT APPLICATIONS

This patent application claims priority to Indian Patent Application Number 6638/CHE/2015, filed Dec. 11, 2015, and entitled "ACCESSING A VIRTUAL VOLUME ON A STORAGE ARRAY," which is incorporated herein by reference in its entirety.

BACKGROUND

Computer data is vital to today's organizations and a significant part of protection against disasters is focused on data protection. Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes receiving, at a storage array, a command to a virtual volume from a host, extracting a virtual volume index from the command; reading a table using the virtual volume index to determine the logical unit where the virtual volume is stored and executing the command at the logical unit with the virtual volume. The command is one of a read command to read data from the virtual volume or a write command to write data to the virtual volume.

In another aspect, an apparatus includes electronic hardware circuitry configured to receive, at a storage array, a command to a virtual volume from a host, extract a virtual volume index from the command, read a table using the virtual volume index to determine the logical unit where the virtual volume is stored and execute the command at the logical unit with the virtual volume. The command is one of a read command to read data from the virtual volume or a write command to write data to the virtual volume.

In a further aspect, an article includes a non-transitory computer-readable medium that stores computer-executable instructions. The instructions cause a machine to receive, at a storage array, a command to a virtual volume from a host, extract a virtual volume index from the command, read a table using the virtual volume index to determine the logical unit where the virtual volume is stored and execute the command at the logical unit with the virtual volume. The command is one of a read command to read data from the virtual volume or a write command to write data to the virtual volume.

DETAILED DESCRIPTION

A version of virtual volumes (VVols) is no longer accessible by traditional hosts (e.g., hosts that are not VMWARE® ESX® of VMWARE® ESXi™ hosts). It is expensive to purchase additional special servers in order to communicate with VVols. There are a number of traditional hosts that need to test with virtual volumes with a significant amount of investment in test utilities designed to work on these traditional hosts. Described herein are techniques to access a virtual volume on a storage array using traditional hosts which will allow previous testing tools to be used without designing new tools. In one example, VVols include but are not limited to VMWARE® virtual volumes.

The following definitions may be useful in understanding the specification and claims.

HOST—at least one computer or networks of computers that runs at least one data processing application that issues I/O requests to one or more storage systems;

I/O REQUEST—an input/output request (sometimes referred to as an I/O), which may be a read I/O request (sometimes referred to as a read request or a read) or a write I/O request (sometimes referred to as a write request or a write);

LOGICAL UNIT—a logical entity provided by a storage system for accessing data on the storage system. The logical disk may be a physical logical unit or a virtual logical unit; and LUN—a logical unit number for identifying a logical unit;

READ COMMAND—a read request to read data (a read I/O request); and

WRITE COMMAND—a write request to write data (a write I/O request).

Figure 1:
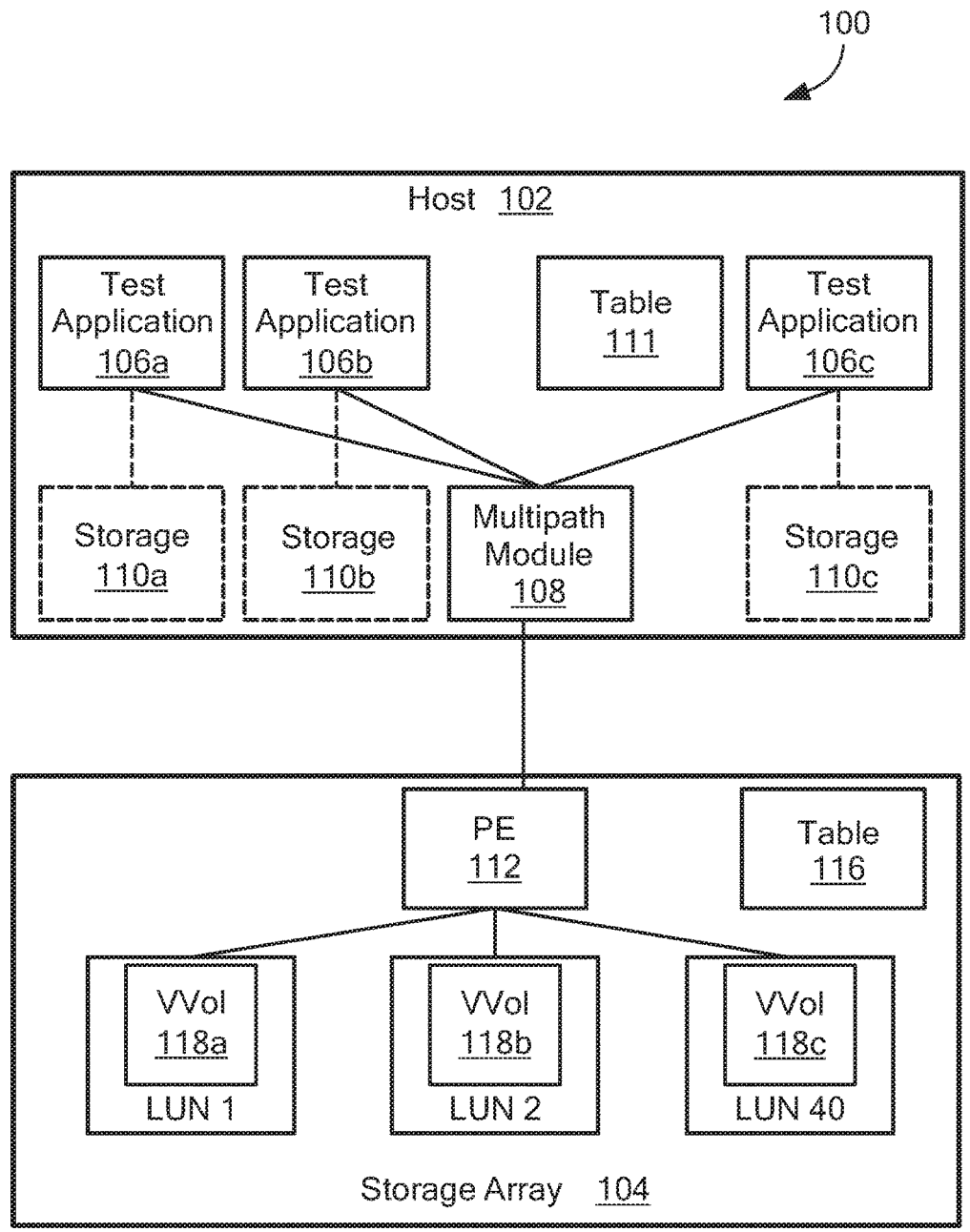
FIG. 1 is a block diagram of an example of a system to access a virtual volume on a storage array.

Referring to FIG. 1, a system 100 is an example of a system to access a virtual volume. The system 100 includes a host 102 and a storage array 104. The host 102 includes test applications 106a-106c, a multipath module 108 and a table 111. In one example, the test applications 106a-106c test storage arrays and in particular storage arrays that include virtual volumes. In one example, the multipath module 108 provides data path management, failover and recovery, and optimized load balancing. In further examples, the multipath module 108 automates, standardizes, and optimizes data paths in physical and virtual environments. In one example, a multipath module 108 includes the features of EMC® POWERPATH®.

The storage array 104 includes a protocol endpoint (PE) 112, a table 116 and virtual volumes (VVol) 118a-118c. The VVol 118a data is stored on a LUN 1, VVol 118b data is stored on a LUN 2 and VVol 118c data is stored on a LUN 40. The table 116 is used to translate a virtual volume index to a LUN.

The PE 112 is a logical I/O proxy. That is, the PE 112 has an address (e.g., Fibre channel address) and to the host 102 looks like a logical unit but with no storage. When there is an association (e.g., a logical connection in the code) between a virtual volume and the PE 112, then the PE 112 may be used to communicate with the virtual volume.

Each test application 106a-106c configured to have its own storage device (i.e., the test application 106a has storage device 110a, the test application 106b has storage device 110b and the test application 106c has storage device 110c) when in reality these storage devices 110a-110c do not exist on the host 102 at all; but rather, the test application s 106a-106c are reading and writing to the storage array 104.

In one particular example, the multipath module 108 is configured to run a management command (e.g., a SCSI (Small Computer System Interface) command). In one example, the management command is configured to associate VVol 118a to the 112 PE. When executed on the storage array 104, the PE 112 will return a status message (e.g., a SCSI message) indicating the index associated with VVol 118a, which is stored in the table 111 (along with table 116).

Figure 2:
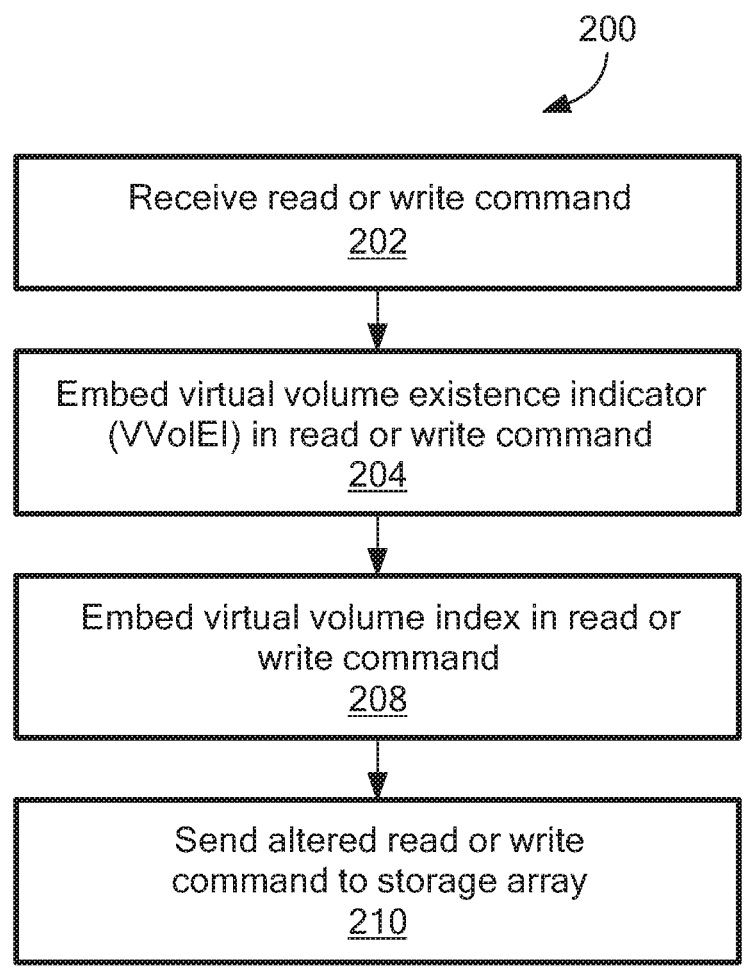
FIG. 2 is a flowchart of an example of a process performed by, for example, a multipath module at a host to send read or write commands to a virtual volume.

Referring to FIG. 2, a process 200 is an example of a process performed by, for example, the multipath module 108 at the host 102 to send read or write commands to a virtual volume. The process 200 receives a read or write command (202). For example, the test application 106a wants to write to the storage 110a and sends a write command, which is received by the multipath module 108.

Process 200 embeds a virtual volume existence indicator (VVolEI) in the read or write command received (204). In one example, the multipath module 108 embeds a VVolEI into a read or write command (e.g., a SCSI command) to indicate that virtual volumes exists and are being read or written to. In another example, the VVolEI is used by the storage array (e.g., the protocol endpoint 112) to look for a VVol index in a particular location in the read or write command. In some examples, the VVolEI may be embedded in a reserved byte of the read or write command or in a control byte of the read or write command. In one particular example, the VVolEI is a first bit in a control byte.

Process 200 embeds a virtual volume index in the read or write command received (208). In one example, the multipath module 108 embeds a virtual volume index from the table 111 into the read or write command to indicate the logical unit where the virtual volume is being read or written to. In other examples, a filter driver residing below the SCSI driver communicates with the MPIO 108 to determine which VVol index to embed. In some examples, the VVol index may be embedded in a reserved byte of the read or write command or in a control byte of the read or write command. In one particular example, the virtual volume index uses bits 2-7 in a control byte of the read or write command.

Process 200 sends the altered read or write command to the storage array (210). For example, the multipath module 108 sends the altered read or write command to the storage array 104.

Figure 3:
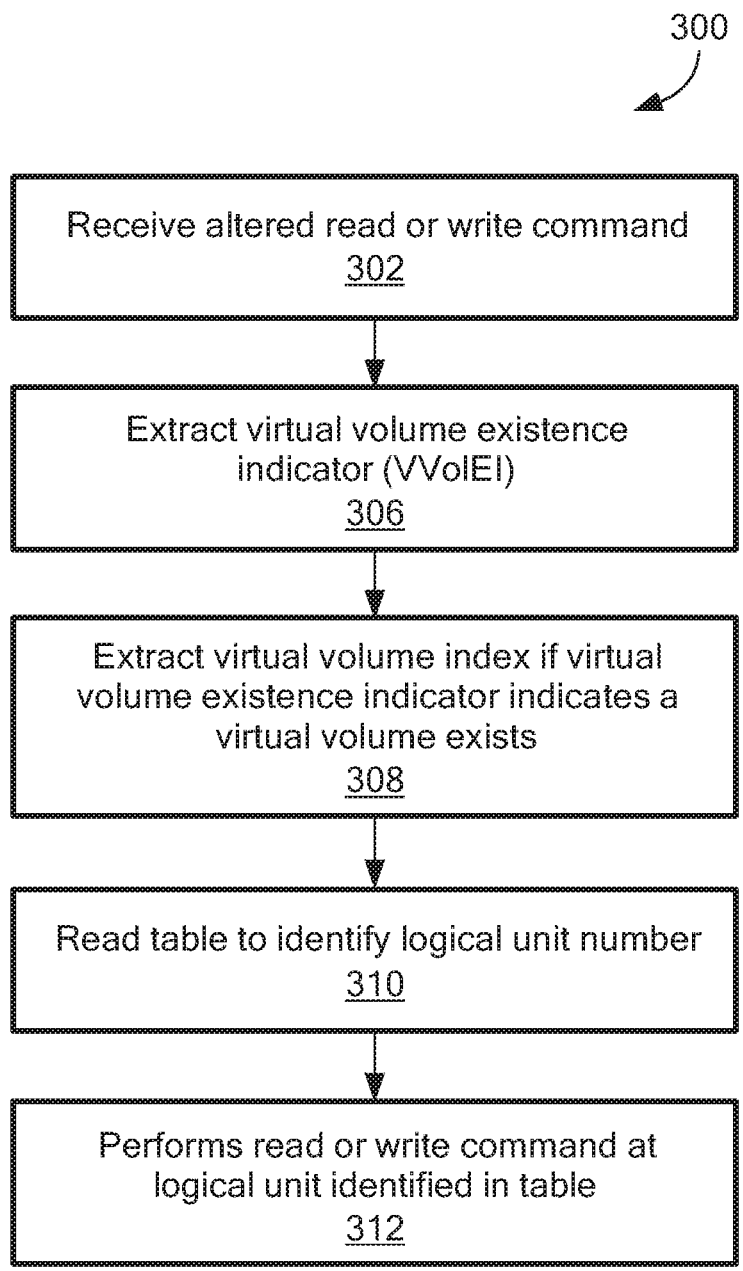
FIG. 3 is a flowchart of an example of a process performed by, for example, a protocol endpoint at a storage array to send read or write commands to a virtual volume.

Referring to FIG. 3, a process 300 is an example of a process performed by the protocol endpoint 112, for example, at the storage array 104 to handle read or write commands to a virtual volume.

Process 300 receives the altered read or write command (302). For example, the PE 112 receives the altered read or write command from the host 102.

Process 300 extracts the virtual volume existence indicator (306). For example, the PE 112 extracts the VVolEI from the read or write command. In one example, the VVolEI having a logical "1" value indicates that virtual volumes exists and are being read or written to while VVolEI having a logical "0" value indicates a virtual volume is not being used. In some examples, a VVolEI is not used at all.

Process 300 extracts the virtual volume index if the virtual volume existence indicator indicates a virtual volume exists (308). For example, if the PE 112 determines that a virtual volume exists then the PE 112 will read the location in the read or write command where the virtual volume index exists.

Process 300 reads a table to identify the LUN using the virtual volume index (310). For example, the PE 112 reads the table 116 and identifies the logical unit containing the virtual volume that will be read or written to according to the virtual volume index extracted from the altered read or write command.

Process 300 performs the read or write command on the logical unit identified in the table (312). For example, the PE 112 performs the read or write command on the virtual volume indicated in processing block 310.

Figure 4:
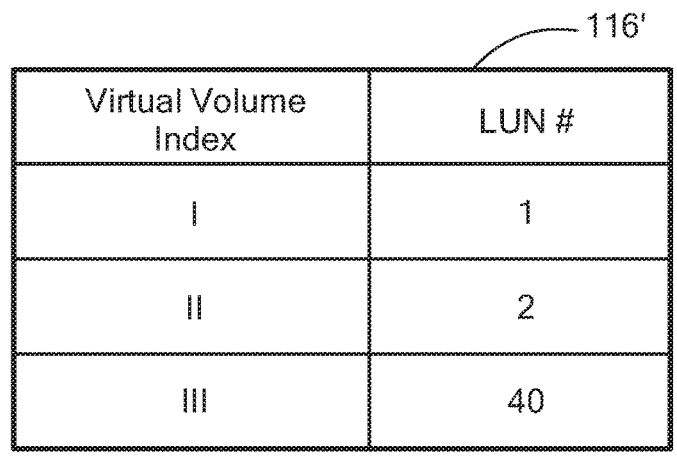
FIG. 4 is a diagram of am example of a table to translate an index to a logical unit number (LUN).

Referring to FIG. 4, a table 116' is an example of the table 116 to translate a virtual volume index value to a LUN. For example, if virtual volume 118c is the intended target of a read command or a write command, then a VVol index of III will be used by the host 102 to identify the LUN 40.

Figure 5:
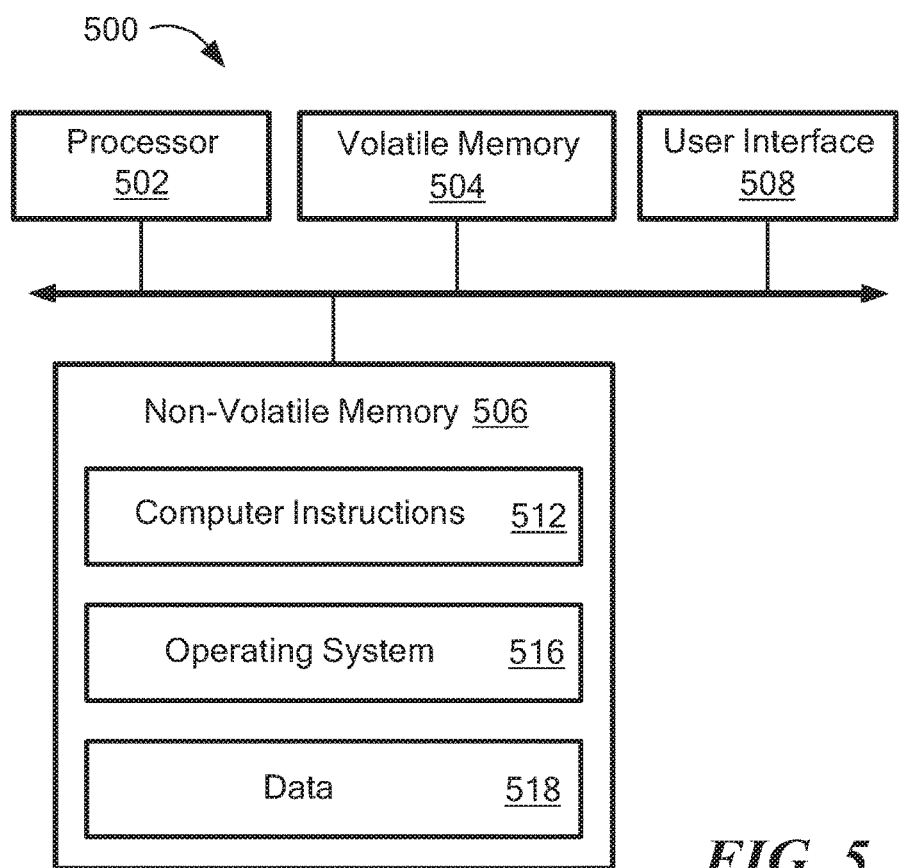
FIG. 5 is a block diagram of an example of a computer on which any of the processes of FIGS. 2 and 3 may be implemented.

Referring to FIG. 5, in one example, a computer 500 includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., processes 200 and 300).

The processes described herein (e.g., processes 200 and 300) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200 and 300 are not limited to the specific processing order of FIGS. 2 and 3, respectively. Rather, any of the processing blocks of FIGS. 2 and 3 may be re-ordered, combined or removed, performed in parallel or in serial, as necessary, to achieve the results set forth above.

The processing blocks (for example, in the processes 200 and 300) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method for testing virtual volumes on a storage array by a host computer system, the method comprising:
   receiving, at the storage array, from a multi-path module at the host computer system, a command to a virtual volume that is subject to the testing, the command being one of a read command to read data from the virtual volume or a write command to write data to the virtual volume, the command intercepted from the host computer system by the multi-path module, the host computer lacking independent accessibility to the storage array, and the multi-path module providing a communication interface between the host computer system and a protocol endpoint of the storage array;
   extracting, by the protocol endpoint, a virtual volume existence indicator from the command, the virtual volume existence indicator indicating whether the virtual volume exists in the storage array;
   if the volume existence indicator indicates that the virtual volume exist:
   extracting, by the protocol endpoint, the virtual volume index from the command;
   reading, by the protocol endpoint, a table using the virtual volume index;
   determining a logical unit where the virtual volume is stored from the virtual volume index; and
   executing the command at the logical unit with the virtual volume; and
   if the virtual volume existence indicator indicates that the virtual volume does not exist, refraining from extracting the virtual volume index and refraining from executing the command.

2. The method of claim 1, further comprising, at the host computer system, embedding the virtual volume index in the command.

3. The method of claim 2, further comprising, at the host computer system, embedding the virtual volume existence indicator in the command.

4. The method of claim 1, further comprising:
   associating the virtual volume to the protocol endpoint; and
   returning a status message to the storage array indicating the virtual volume index associated with the virtual volume.

5. An apparatus for testing virtual volume on a storage array by a host computer system, the apparatus comprising:
   electronic hardware circuitry configured to:
   receive, at the storage array, from a multi-path module at the host computer system, a command to a virtual volume that is subject to the testing, the command being one of a read command to read data from the virtual volume or a write command to write data to the virtual volume, the command intercepted from the host computer system by the multi-path module, the host computer lacking independent accessibility to the storage array, and the multi-path module providing a communication interface between the host computer system and a protocol endpoint of the storage array;
   extract, by the protocol endpoint, a virtual volume existence indicator from the command, the virtual volume existence indicator indicating whether the virtual volume exists in the storage array;
   if the volume existence indicator indicates that the virtual volume exist:
   extract, by the protocol endpoint, the virtual volume index from the command;
   read, by the protocol endpoint, a table using the virtual volume index;
   determine a logical unit where the virtual volume is stored from the virtual volume index; and
   execute the command at the logical unit with the virtual volume; and
   if the virtual volume existence indicator indicates that the virtual volume does not exist, refrain from extracting the virtual volume index and refraining from executing the command.

6. The apparatus of claim 5, wherein the circuitry comprises at least one of a processor, a memory, a programmable logic device or a logic gate.

7. The apparatus of claim 5, further comprising, at the host computer system, circuitry configured to embed the virtual volume index in the command.

8. The apparatus of claim 7, further comprising, at the host computer system, circuitry configured to embed the virtual volume existence indicator in the command.

9. The apparatus of claim 5, further comprising circuitry configured to:
   associate the virtual volume to the protocol endpoint; and
   return a status message to the storage array indicating the virtual volume index associated with the virtual volume.

10. An article for testing virtual volumes on a storage array by a host computer system, the article comprising:
    a non-transitory computer-readable medium that stores computer-executable instructions, the instructions causing a machine to:
    receive, at the storage array, from a multi-path module at the host computer system, a command to a virtual volume that is subject to the testing, the command being one of a read command to read data from the virtual volume or a write command to write data to the virtual volume, the command intercepted from the host computer system by the multi-path module, the host computer lacking independent accessibility to the storage array, and the multi-path module providing a communication interface between the host computer system and a protocol endpoint of the storage array;

extract, by the protocol endpoint, a virtual volume existence indicator from the command, the virtual volume existence indicator indicating whether the virtual volume exists in the storage array;

if the virtual volume existence indicates that the virtual volume exists:

extract, by the protocol endpoint, the virtual volume index from the command;

read, by the protocol endpoint, a table using the virtual volume index;

determine a logical unit where the virtual volume is stored from the virtual volume index; and execute the command at the logical unit with the virtual volume; and if the virtual volume existence indicator indicates that the virtual volume does not exist, refrain from extracting the virtual volume index and refraining from executing the command.

11. The article of claim 10, further comprising, at the host computer system, instructions causing the machine to embed the virtual volume index in the command.

12. The article of claim 11, further comprising, at the host computer system, instructions causing the machine to embed the virtual volume existence indicator in the command.

13. The article of claim 10, further comprising instructions causing the machine to:

associate the virtual volume to the protocol endpoint; and return a status message to the storage array indicating the virtual volume index associated with the virtual volume.

14. The method of claim 1, wherein the protocol endpoint at the storage array comprises a logical input/output (IO) proxy that is addressable by the host computer system as a logical unit.

* * * * *